United States Patent [19]
Nakayama et al.

[11] Patent Number: 5,946,287
[45] Date of Patent: Aug. 31, 1999

[54] OPTICAL DISK HAVING PITS WITH PUSH-PULL SIGNAL OF OPPOSITE POLARITY TO THAT OF GUIDE GROOVES

[75] Inventors: Hiroshi Nakayama; Masaki Kagawa, both of Miyagi, Japan

[73] Assignee: Sony Corporation, Tokyo, Japan

[21] Appl. No.: 08/913,066

[22] PCT Filed: Dec. 27, 1996

[86] PCT No.: PCT/JP96/03892

§ 371 Date: Aug. 15, 1997

§ 102(e) Date: Aug. 15, 1997

[87] PCT Pub. No.: WO97/24719

PCT Pub. Date: Jul. 10, 1997

[30] Foreign Application Priority Data

Dec. 28, 1995 [JP] Japan .................................. 7-344216

[51] Int. Cl.⁶ ........................................................ G11B 7/24
[52] U.S. Cl. ........................................ 369/275.4; 369/275.1
[58] Field of Search ................................. 369/275.4, 275.1, 369/277, 278, 279, 272, 58, 44.26; 430/321, 320; 428/64.4, 64.1

[56] References Cited

U.S. PATENT DOCUMENTS 4,949,331  8/1990  Maeda et al. ......................... 369/275.3

FOREIGN PATENT DOCUMENTS 63-32746  2/1988  Japan .
63-50933  3/1988  Japan .
3-80443   4/1991  Japan .

*Primary Examiner*—Tan Dinh
*Attorney, Agent, or Firm*—Hill & Simpson

[57] ABSTRACT

An optical disc adapted so that concentrical or spiral guide grooves are formed at a base and emboss shaped pits are molded between these respective guide grooves is disclosed. In this optical disc, depth of pit is set so that the push-pull signal by the pits is caused to have reverse polarity with respect to the push-pull signal by the guide grooves. For example, when wavelength of reproduction laser beams is $\lambda$, refractive index of the base is n, and track pitch is t, the depth Dp of the pit is set so as to fall within the range $0.32\ \lambda/n \leq Dp \leq 0.51\ \lambda/n$, the width Wp of the pit is set so as to fall within the range $0.27\ t \leq Wp \leq 0.36\ t$, and the depth Dg and the width Wg of the guide groove are respectively set so as to fall within the ranges $0.0875\ \lambda/n \leq Dg \leq 0.1625\ \lambda/n$ and $0.27\ t \leq Wg \leq 0.36\ t$.

1 Claim, 9 Drawing Sheets

OPTICAL DISK HAVING PITS WITH PUSH-PULL SIGNAL OF OPPOSITE POLARITY TO THAT OF GUIDE GROOVES

BACKGROUND OF THE INVENTION

This invention relates to an optical disc including guide grooves and pits, and more particularly to improvements for obtaining reasonable push-pull signals.

Optical discs using the so-called ISO standard have spiral guide grooves, wherein emboss shaped pits are molded (formed) in advance between respective grooves at the inner circumferential portion or the header portion.

In such optical discs, the optical pick-up is subjected to seek operation in the radial direction of the disc to move it to the target track on the basis of tracking error signal (so called push-pull signal) from the groove. In that regard, a threshold is set in the vicinity of center value of the push-pull signal to detect how many times the push-pull signal crosses (traverses) this threshold to thereby count the number of tracks to detect the target track. At the same time, the target address is detected on the basis of an address signal from the emboss shaped pit to carry out recording or reproduction of information.

Meanwhile, in these optical discs where pits in emboss form are molded in advance between respective as described above, a phenomenon occurs in that the signal amplitude of the tracking error signal (the so called push-pull signal) in the area including pits is reduced to one half ($\frac{1}{2}$)~one third ($\frac{1}{3}$) as compared to the signal amplitude in the area comprised of only grooves.

This is because an approach has been conventionally preferentially employed to take the information signal amplitude from the area comprised of only grooves as a large value, so the tracking error signal from the area including pits is sacrificed.

Accordingly, when the tracking error signal is greatly reduced in the area including pits by the phenomenon described above, inconveniences occur such that tracking cannot be precisely under taken and/or any error takes place in the tracking count operation.

SUMMARY OF THE INVENTION

An object of this invention is to provide an optical disc capable of suppressing a decrease of the signal amplitude of the push-pull signal in the area where grooves and pits are mixed.

To attain the above-described object, an optical disc of this invention is directed to an optical disc in which concentrical or spiral guide grooves are formed on a base (substrate), and pits in emboss form are molded between these respective guide grooves, the depth of the pits being set so that a push-pull signal by the pits is caused to exhibit reverse polarity with respect to a push-pull signal by the guide grooves.

In a more practical sense, when the wavelength of reproduction laser beams is $\lambda$ and refractive index of the base is n, the depth Dp of the pit is caused to fall within the range expressed as $0.32\ \lambda/n \leq Dp \leq 0.51\ \lambda/n$.

Preferably, that when the track pitch is t, the width Wp of the pit is $0.27\ t \leq Wp \leq 0.36\ t$.

Further, the depth Dg and the width Wg of the guide groove preferably are respectively expressed as $0.0875\ \lambda/n \leq Dg \leq 0.1625\ \lambda/n$ and $0.27\ t \leq Wg \leq 0.36\ t$.

In this invention, since the depth of the pit is set so that it falls within the reasonable range, there is no possibility that a bad influence is exerted on the push-pull signal. As a result, e.g., the possibility that any erroneous counting may take place at the time of tracking count operation is lessened. In addition, an adequate information signal amplitude from the area including pits is ensured.

In accordance with this invention, in the area comprised of only grooves and the area where pits exist between respective grooves, an approach can be made such that the polarities and the magnitudes of push-pull signals (from the respective areas), which are the most important for the purpose of tracking of the laser beam spot, are not caused to be changed.

Since the previously described effect can be obtained also in the case where the laser beam spot crosses (traverses) the header area (area from which address signal is obtained) of the optical disc, erroneous counts can be reduced when the push-pull signal is used for the track counting operation.

These and other features of the invention are discussed in greater detail below in the following detailed description of the presently preferred embodiments with reference to the accompanying drawings.

BRIEF DESCRIPTION OF THE DRAWINGS

Figure 1:
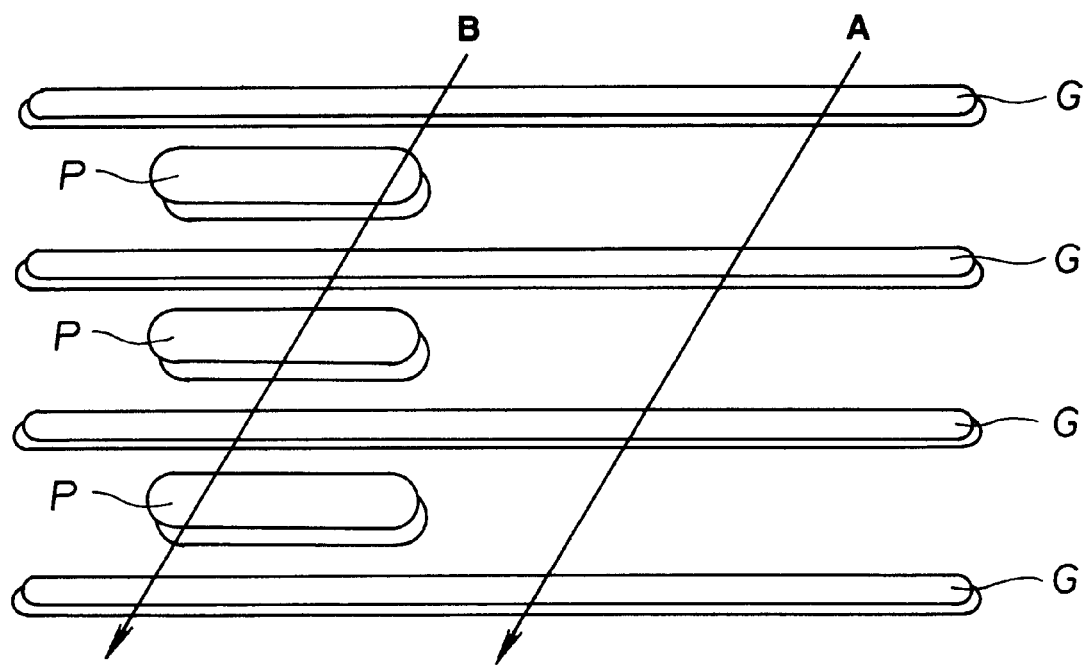
FIG. 1 is a model view showing surface configuration of optical disc base where pits and grooves are formed.

FIG. 1 represents, in a model form, the surface configuration of an optical disc base (substrate) where grooves G and emboss shaped pits P are formed. In this case, the area where the pits P are formed corresponds to the header portion. In this example, reflection film, recording film, and dielectric film and/or protective film, etc. are formed by a configuration corresponding to use (purpose) on the base so that the optical disc is provided.

When laser beams are irradiated onto the optical disc in the in-focus state to scan (seek) the laser (beam) spot in the radial direction of the disc, push-pull signal is observed. In the figure, arrow A indicates the state (direction) where the portion comprised of only grooves (groove portion or area) is scanned, and arrow B indicates the state (direction) where the portion including pits (the pit portion or area) is scanned.

The push-pull method is a method of taking out light reflected and diffracted at track on the disc as an output difference at two light receiving portions (photo-detecting portions) on the bi-sected detector PD symmetrically disposed with respect to the track center to thereby detect tracking error.

Figure 2:
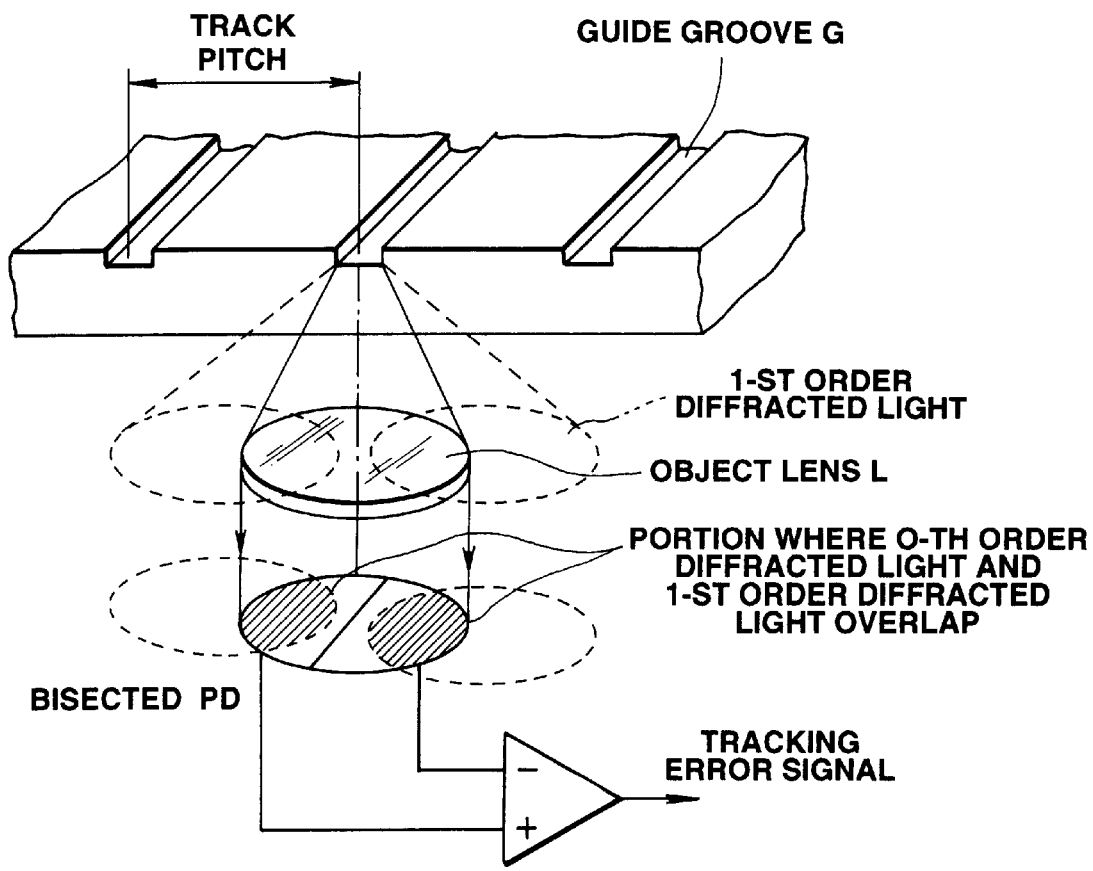
FIG. 2 is a model view for explaining the principle of the push-pull method.

The explanatory view of the principle is shown in FIG. 2.

In the case where the center of the laser spot and the center of the guide groove G are in correspondence with each other, reflected and diffracted light symmetrical in left and right directions can be obtained. In contrast, in the case where those centers are not in correspondence with each other, there results reflected and diffracted light asymmetrical in left and right directions. As a result, a difference in the light intensity obtained at (respective detecting portions of) the bi-sected photodetector PD takes place.

A difference signal between output signals from these two photo-detecting portions is obtained as a push-pull signal having polarity, and is used for tracking.

Moreover, when a difference between output signals obtained by the two photo-detecting portions when the laser spot crosses (traverses) the track at the time of track access is taken, the difference signal thus obtained represents S-shaped curve.

For example, the push-pull signal (S-shaped curve) obtained from the grooves and the push-pull signal (S-shaped curve) obtained from the pits are indicated as shown in FIG. 3. A signal obtained by combining (synthesizing) these both signals results in an actual push-pull signal obtained at the header portion.

In this case, in accordance with the study of the inventor of this application, it has been found that the push-pull signal changes in dependency upon depth of the groove or the pit and its polarity is inverted with $\lambda/4$ ($\lambda$ is wavelength of laser beams) being as the boundary.

Figure 4:
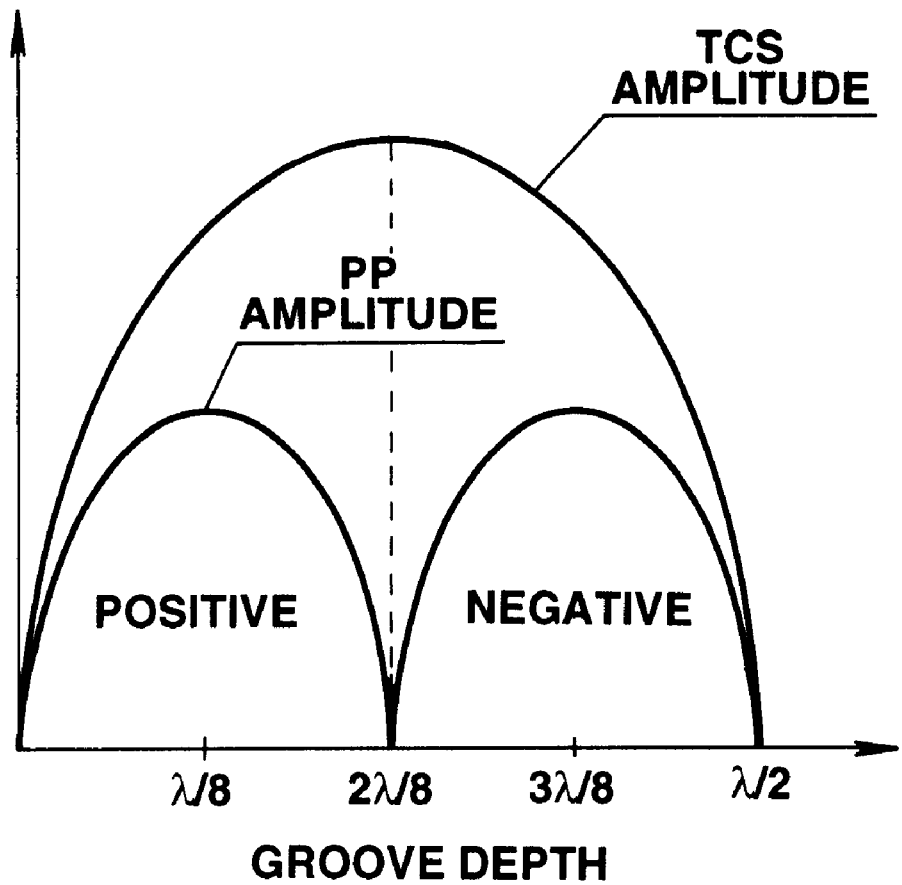
FIG. 4 is a characteristic diagram conceptually, along with TCS signal, the state of change of push-pull signal by depth of groove.

Let now consider the case where the push-pull signal from the grooves and the push-pull signal from the pits are the same. It is to be noted that since the push-pull signal from the grooves is the primary push-pull signal, the depth of the groove is caused to be value ($\lambda/8$) where (the amplitude of) the push-pull signal becomes maximum in FIG. 4.

Figures 3A, 3B:
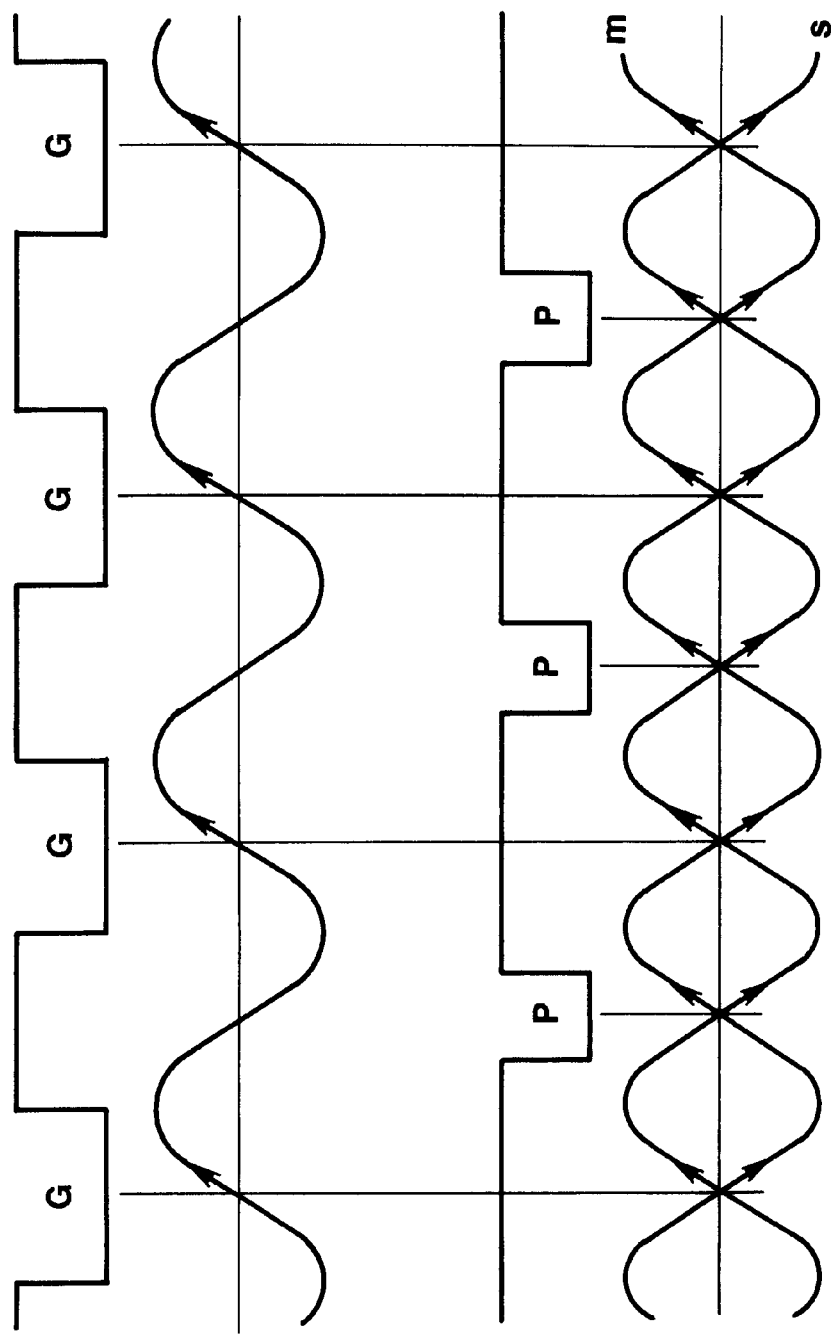
FIGS. 3(A,B) is a characteristic diagram showing, in a comparative manner, push-pull signal by the grooves and push-pull signal by the pits.

As shown in FIG. 3A, the push-pull signal by grooves crosses (traverses) the base line (line of the center value) at the centers of respective grooves. At this time, the crossing (traversing) direction is in the upper direction (the polarity of the push-pull signal at this time is assumed to be positive).

On the other hand, the pits exist at the intermediate portions between the respective grooves, and the push-pull signal by pits is as shown in FIG. 3B. In the case where setting is made with respect to the depth of pit such that (polarity of) the push-pull signal is positive, the push-pull signal is as indicated by line s in FIG. 3B. At the centers of respective pits, similarly to the previously described push-pull signal by grooves, the direction in which the push-pull signal crosses (transverses) the base line is the upper direction. On the other hand, at the respective groove centers, that direction is the lower direction.

As a result, at the groove centers, there results the state where the push-pull signal by grooves is canceled by the push-pull signal by pits. Thus, (the signal amplitude of) the resultant push-pull signal is greatly lowered. As a result, large noise is observed.

Figure 5:
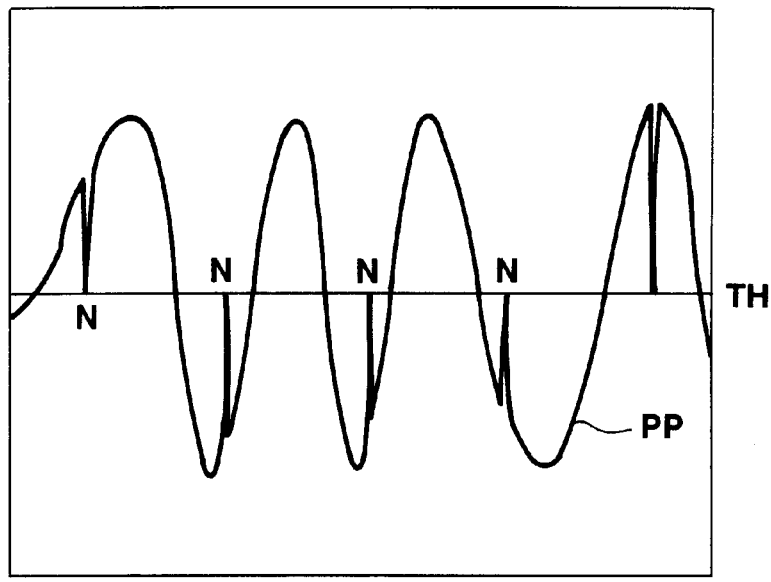
FIG. 5 is a characteristic diagram showing a typical example of push-pull signal including noises.

The signal actually observed is shown in FIG. 5. This FIG. 5 shows the state where the push-pull signal is observed at the pit portion (the groove portion with header which corresponds to (the area scanned in the direction indicated by) arrow B).

It is found from this figure that signals (signal components) from the pits P are superposed on the (resultant) push-pull signal PP as respective noises (noise components) N, and there thus results high possibility that erroneous counting may take place, e.g., at the time of tracking count operation by the push-pull signal.

On the contrary, in the case where setting is made with respect to the depth of the pit such that the push-pull signal becomes negative, the push-pull signal by pits is as indicated by line m in FIG. 3B. At the respective groove centers, when the light spot moves (shifts) from the left to the right in the figure, the direction in which the push-pull signal crosses (traverses) the base line is the upper direction. This direction is the same direction as that of the push-pull signal by grooves. Accordingly, there is no possibility that there results great lowering in the push-pull signal by grooves.

Figure 6:
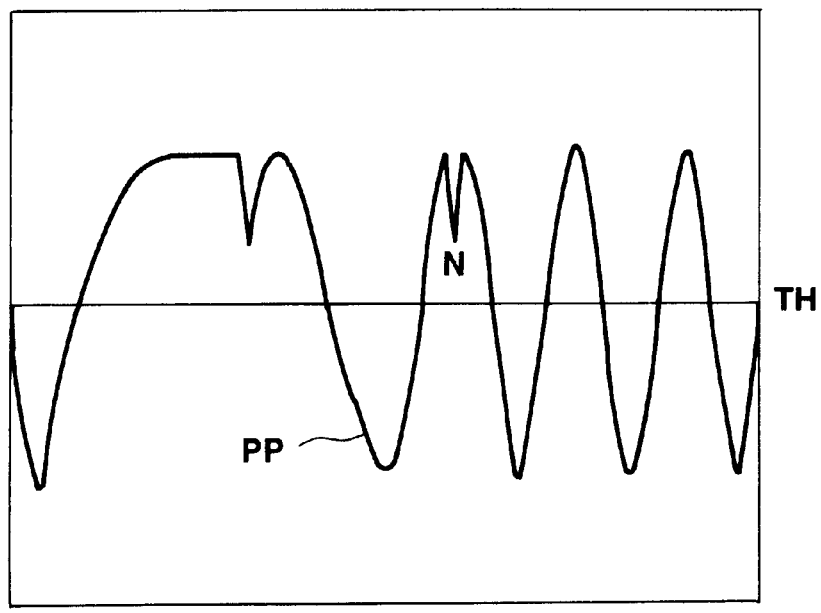
FIG. 6 is a characteristic diagram showing push-pull signal in which the pit depth is caused to be reasonable so that noise is reduced.

FIG. 6 shows the state where the push-pull signal is observed at the pit portion (the groove portion with header which corresponds to (the area scanned in the direction indicated by) the arrow B) when such a setting is made. Noise N is hardly observed.

How the push-pull signal (P—P) and the TCS (Track-cross signal) change when the depth of the pit is actually changed was studied on the basis of the above-mentioned finding.

In the above-mentioned study, parameters employed are as indicated in the Table 1. In addition, scalar analytic method of diffraction was used in the analysis.

TABLE 1

| Reproduction Optical System | |
| --- | --- |
| Laser Wavelength: | 680 nm |
| Lens NA: | 0.55 |
| Filling of Lend: | 1.0/1.0 |
| Disc | |
| Material: | Polycarbonate (refractive index n = 1.59) |
| Track Pitch: | 1.10 $\mu$m |
| Groove Width: | 0.3 $\mu$m |
| Groove Depth: | $\lambda/8$ |
| Groove shape: | Parabola |
| Pit Depth: | 0, $\lambda/4$, $7\lambda/24$, $\lambda/3$, $3\lambda/8$ |
| Pit Width: | 0.2 $\mu$m |
| Gradient of Pit Edge: | 0.05 $\mu$m |

Figure 7:
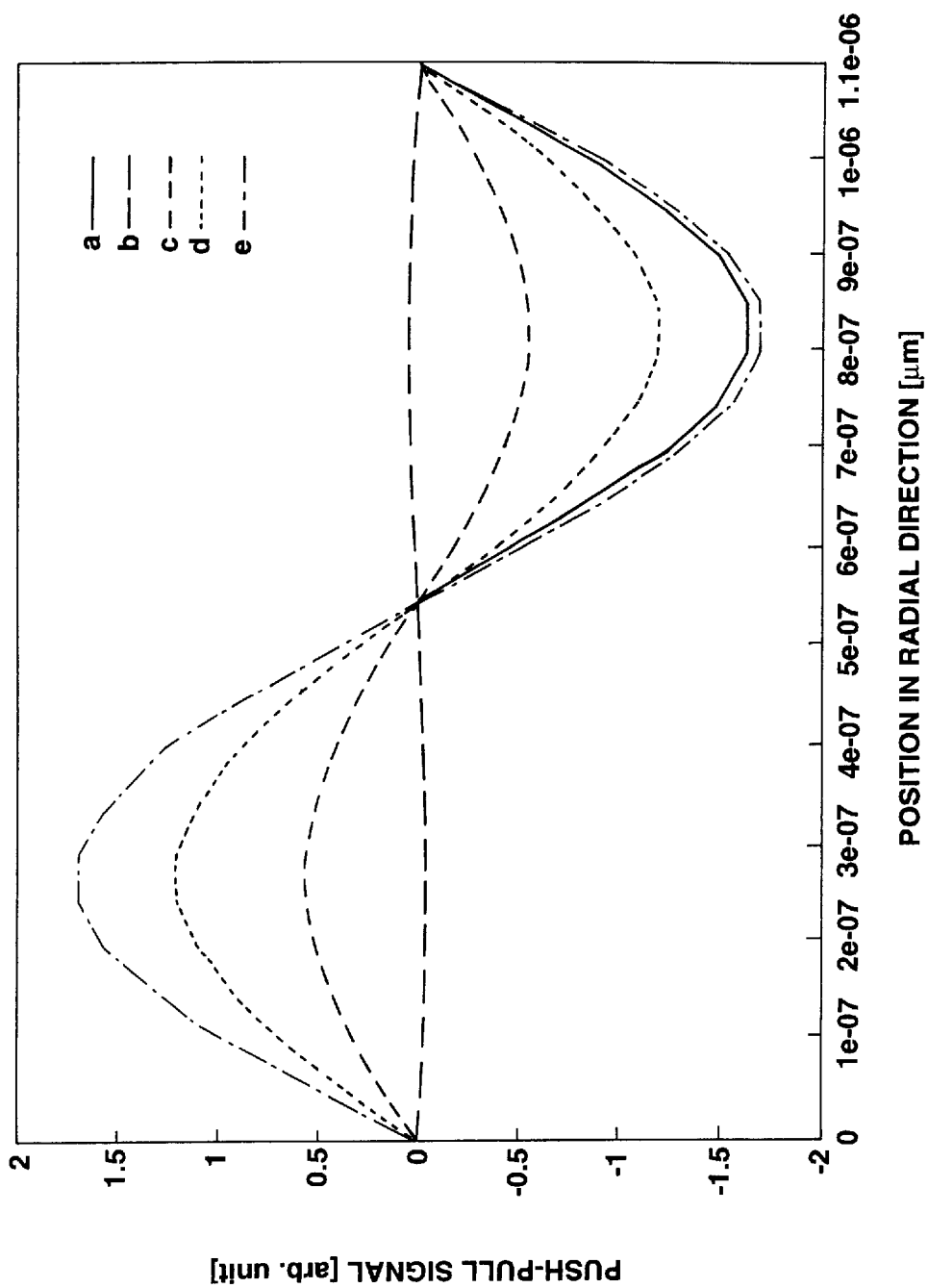
FIG. 7 is a characteristic diagram showing change of push-pull signal by pit depth Dp.

FIG. 7 is a diagrammatical view showing difference of the push-pull signal versus the depth Dp of the pit. In this figure, the right end and the left end correspond to the track center. Accordingly, the push-pull signal when the light spot crosses (traverses) a single track is indicated with the signal intensity being taken on the ordinate in FIG. 7.

Moreover, in the figure, the solid line a indicates the push-pull signal in the groove area (the pit depth Dp=0 which corresponds to (the area scanned in the direction indicated by) the arrow A in the FIG. 1 mentioned above), and other lines b, c, d, e indicate push-pull signals in the areas including pits different in depth (hereinafter each simply referred to as the pit area as occasion may demand). (In the figure, the line b indicates the push-pull signal at the pit depth of $\lambda/4n$, the line c indicates the push-pull signal at the pit depth of $7\lambda/24n$, the line d indicates the push-pull signal at the pit depth of $\lambda/3n$, and the line e indicates the push-pull signal at the depth of $3\lambda/8n$.

It has been found from this figure that the push-pull signal in the pit area has substantially the same intensity as that of the push-pull signal in the groove area when the pit depth Dp is equal to $3\lambda/8n$.

Figure 8:
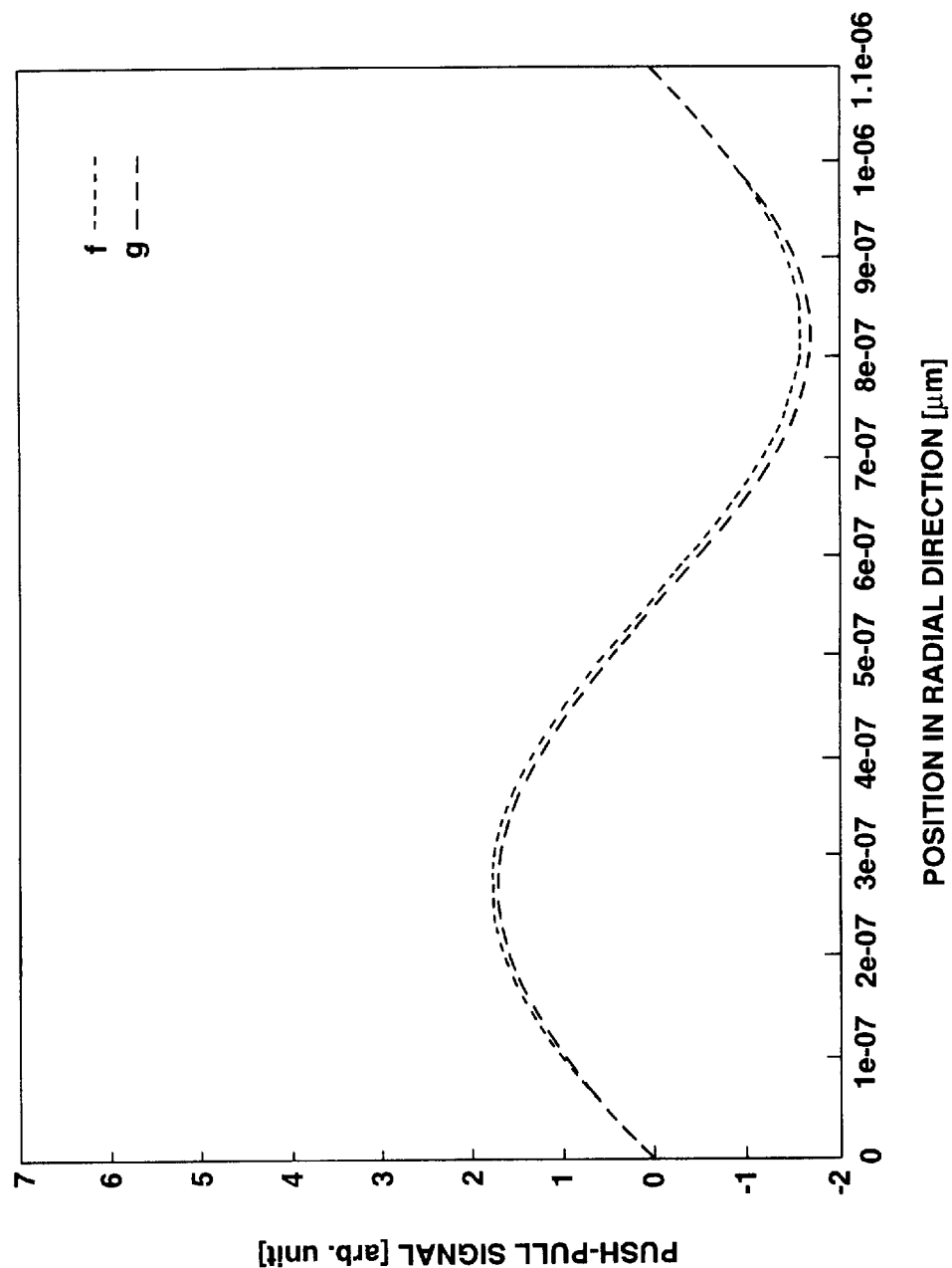
FIG. 8 is a characteristic diagram showing the state of push-pull signal in the case where track where pits exist and track where no pit exists are adjacent to each other.

Further, FIG. 8 is a diagram showing push-pull signals similar to the above in connection with the case where the track where pits exist and the track where no pit exists are adjacent to each other.

In FIG. 8, the line f indicates the push-pull signal in the state where only grooves exist, and the line g indicates the push-pull signal in the state where the track where pits exist and the track where no pit exist are adjacent to each other. In this case, the depth Dp of pit is $3\lambda/8n$.

Also in this case, the influence that the pit exerts on the push-pull signal can be hardly observed. Even if a track having pit at one side and a track having no pit at the other side are adjacent to each other, the deviation quantity of push-pull is less than 0.01 μm. This value is very small as compared to the track pitch.

Figure 9:
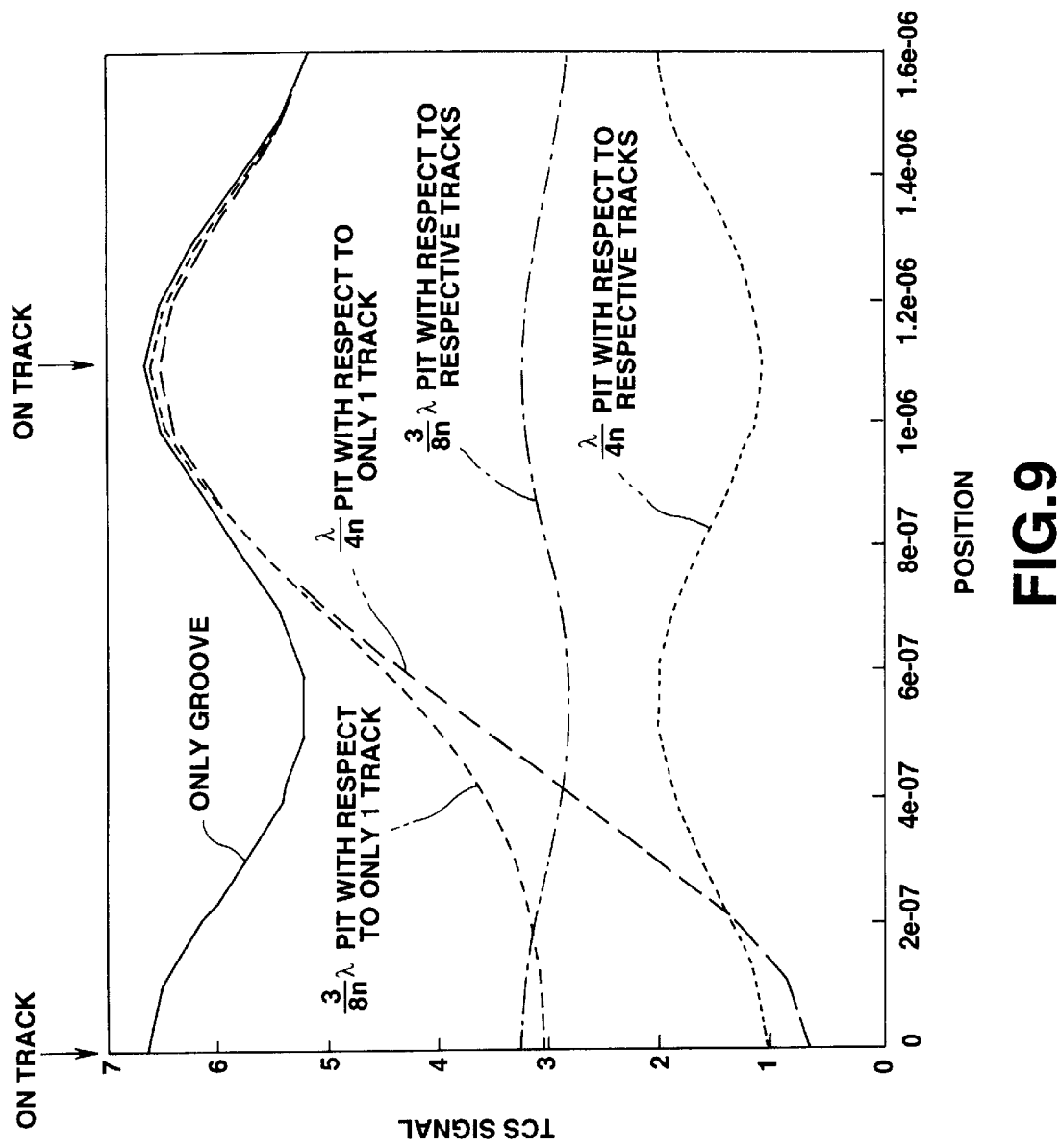
FIG. 9 is a characteristic diagram showing change of TCS signal by pit depth Dp.

On the other hand, a TCS signal when the depth Dp of pit is changed is shown in FIG. 9. From this FIG. 9, change of the pit modulation factor (degree) based on difference of pit depth Dp can be recognized.

When viewed from this figure, the pit modulation factor becomes maximum when the pit depth Dp is a value in the vicinity of $\lambda/4n$ ($I_{SM}/I_{OL}$=0.89: When pits exist at respective tracks, $I_{SM}/I_{OL}$ becomes equal to 0.84), and the pit modulation factor is decreased by about 25% when the pit depth Dp is equal to $3\lambda/8n$ ($I_{SM}/I_{OL}$=0.54: When pits exist at respective tracks, $I_{SM}/I_{OL}$ is equal to 0.51).

While, in consideration of the data accuracy, etc., in the prior art, the pit depth Dp was set to $\lambda/4n$ so that the information signal amplitude from the pit area becomes maximum, setting is assumed to be made in this invention such that the pit depth Dp is a value in the vicinity of $3\lambda/8n$ in consideration of the push-pull signal for tracking.

In this case, also as previously indicated, the pit modulation factor is somewhat decreased, but decrease of the pit modulation factor to such a degree can be tolerable (allowed). In this connection, the tolerance (allowable) limit (limitation) in the ISO standard (e.g., ISO-IEC-DIS 14517: magneto-optical disc cartridge having diameter of 130 mm and disc memory capacity of 2.6 GB) is expressed as $0.45 \leq I_{SM}/I_{OL} \leq 0.95$.

Figure 10:
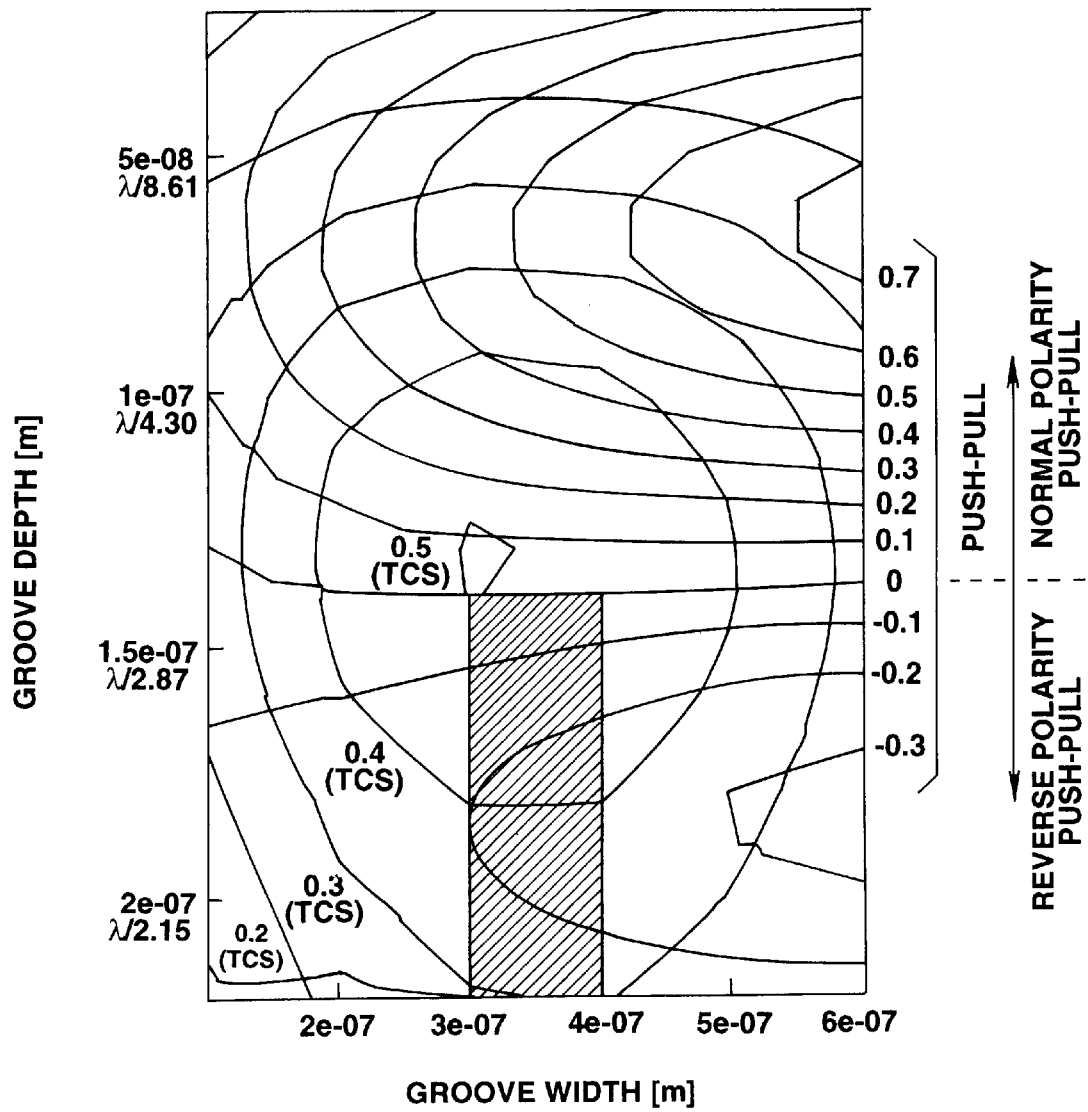
FIG. 10 is a characteristic diagram showing, in a model form, groove width and groove depth dependency of TCS signal and push-pull signal.

FIG. 10 shows, by the contour (value) line, the state of change of the push-pull signal and the TCS signal when the depth and the width of the groove are used as parameter. (The condition is recited as below.)
<Condition>
Disc
Track pitch 1.1 μm
Groove shape Parabola
Polycarbonate base (substrate) (refractive index 1.58)
Optical system
Wavelength λ 680 nm
NA 0.55

It can be seen from this FIG. 10 that when the groove becomes deep, the polarity of the push-pull signal is inverted.

The gist of the invention of this application resides in that such inverting phenomenon of the push-pull signal is applied to the optical disc including the area where grooves and pits are mixed to thereby suppress lowering of the push-pull signal at the pit portion.

The fact that the modulation factor of the pit is caused to be maximum corresponds to the fact that (the amplitude of) the TCS signal is caused to be large. When the area of the groove width of 0.3~0.4 μm is assumed, the area where (the amplitude of) the TCS signal is large within the inverting push-pull area of) the TCS signal is large within the inverting push-pull area is the area where the groove depth is 140~220 nm. It is thus sufficient to employ pits of this depth.

Accordingly, when it is assumed that the pit width is taken on the ordinate and the pit depth is taken on the abscissa in FIG. 10, it is sufficient to make a setting such that the pit depth becomes equal to the depth corresponding to the slanting line area in the figure.

Although modifications and changes may be suggested by those skilled in the art, it is the intention of the inventors to embody within the patent warranted hereon all changes and modifications as reasonably and properly come within the scope of their contribution to the art.

In more practical sense, it can be seen from this FIG. 10 that, in order to ensure the required push-pull signal intensity while ensuring the TCS signal intensity, it is sufficient to set the pit depth Dp so as to fall within the range of $0.32 \lambda/n \sim 0.51 \lambda/n$.

We claim:

1. An optical disk comprising a substrate having concentric or spiral guide grooves formed thereon, and emboss-shaped pits molded between the guide grooves, wherein, a depth of the pits is set so that a push-pull signal of the pits is caused to have reverse polarity with respect to a push-pull signal of the guide grooves.

wherein when a wavelength of a reproduction laser beam is λ, a refractive index of the substrate is n, and a track pitch of the groove is t, then the depth Dp of the pits set so as to fall within the range $0.32 \lambda/n \leq Dp \leq 0.51 \lambda/n$, a width Wp of the pits is set so as to fall within the range $0.27 t \leq Wp \leq 0.36 t$, and a depth Dg and width Wg of the guide grooves are respectively set so as to fall within the ranges $0.0875 \lambda/n \leq Dg \leq 0.1625 \lambda/n$ and $0.27 t \leq Wg \leq 0.36$.

* * * * *